(12) United States Patent
Dunn et al.

(10) Patent No.: US 9,032,022 B1
(45) Date of Patent: May 12, 2015

(54) SENDING AND RECEIVING CONFIGURABLE BUCKETS OF COMMUNICATIONS

(75) Inventors: Ian Dunn, San Francisco, CA (US); Robert Aaron Jones, San Francisco, CA (US); Dan Racanelli, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 178 days.

(21) Appl. No.: 13/554,679

(22) Filed: Jul. 20, 2012

Related U.S. Application Data

(60) Provisional application No. 61/626,692, filed on Oct. 1, 2011.

(51) Int. Cl.
  *G06F 15/16* (2006.01)
  *H04L 29/06* (2006.01)

(52) U.S. Cl.
  CPC .................................... *H04L 67/42* (2013.01)

(58) Field of Classification Search
  CPC .................................................. H04L 47/6255
  USPC ................................................ 709/201, 203
  See application file for complete search history.

(56) References Cited

U.S. PATENT DOCUMENTS

2002/0143915 A1* 10/2002 Mathieson ..................... 709/223
2011/0212783 A1*  9/2011 Dale et al. ....................... 463/42

* cited by examiner

*Primary Examiner* — Quang N Nguyen
*Assistant Examiner* — Andrew Woo
(74) *Attorney, Agent, or Firm* — Schwegman Lundberg & Woessner, P.A.

(57) ABSTRACT

A method of sending and receiving configurable buckets of communication is disclosed. A request to send a communication from an application executing on a client to an application executing on a server is received. The communication has a first priority. A request to send an additional communication from the application executing on the client to the application executing on the server is received. The additional communication has a second priority. The communication is placed into a bucket of communications based on the communication having the first priority. A determination is made to send the bucket of communications to the application executing on the server. The additional communication is placed into the bucket of communications based on a determination that the bucket of communications is not full. The bucket of communications is sent to the application executing on the server.

17 Claims, 11 Drawing Sheets

… (1) …

SENDING AND RECEIVING CONFIGURABLE BUCKETS OF COMMUNICATIONS

CROSS-REFERENCE TO RELATED APPLICATIONS

This application claims the benefit of U.S. Provisional Application No. 61/626,692, filed Oct. 1, 2011, entitled "SENDING AND RECEIVING CONFIGURABLE BUCKETS OF COMMUNICATIONS," which is incorporated herein by reference in its entirety.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events, and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, and so forth. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

An electronic social networking system typically operates with one or more social networking servers providing interaction between users such that a user can specify other users of the social networking system as "friends." A collection of users and the "friend" connections between users can form a social graph, which can be traversed to find second, third, and more remote connections between users, much like a graph of nodes connected by edges can be traversed.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

In many computer games, there are various types of in-game actions that a player character can take within the game. For example, a player character in an online role-playing game may be able to interact with other player characters, build a virtual house, attack enemies, go on a quest, go to a virtual store to buy/sell virtual items, and the like. A player character in an online poker game may be able to play at specific tables, place bets of virtual currency for certain amounts, play or fold certain hands, play in a online poker tournament, and so forth.

BRIEF DESCRIPTION OF THE DRAWINGS

Some embodiments are illustrated by way of example and not limitation in the figures of the accompanying drawings in which.

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

In various embodiments, methods and systems of sending and receiving configurable buckets of communication are disclosed. A request to send a communication from an application executing on a client to an application executing on a server is received. The communication has a first priority. A request to send an additional communication from the application executing on the client to the application executing on the server is received. The additional communication has a second priority. The communication is placed into a bucket of communications based on the communication having the first priority. A determination is made to send the bucket of communications to the application executing on the server. The additional communication is placed into the bucket of communications based on a determination that the bucket of communications is not full. The bucket of communications is sent to the application executing on the server.

Figure 1:
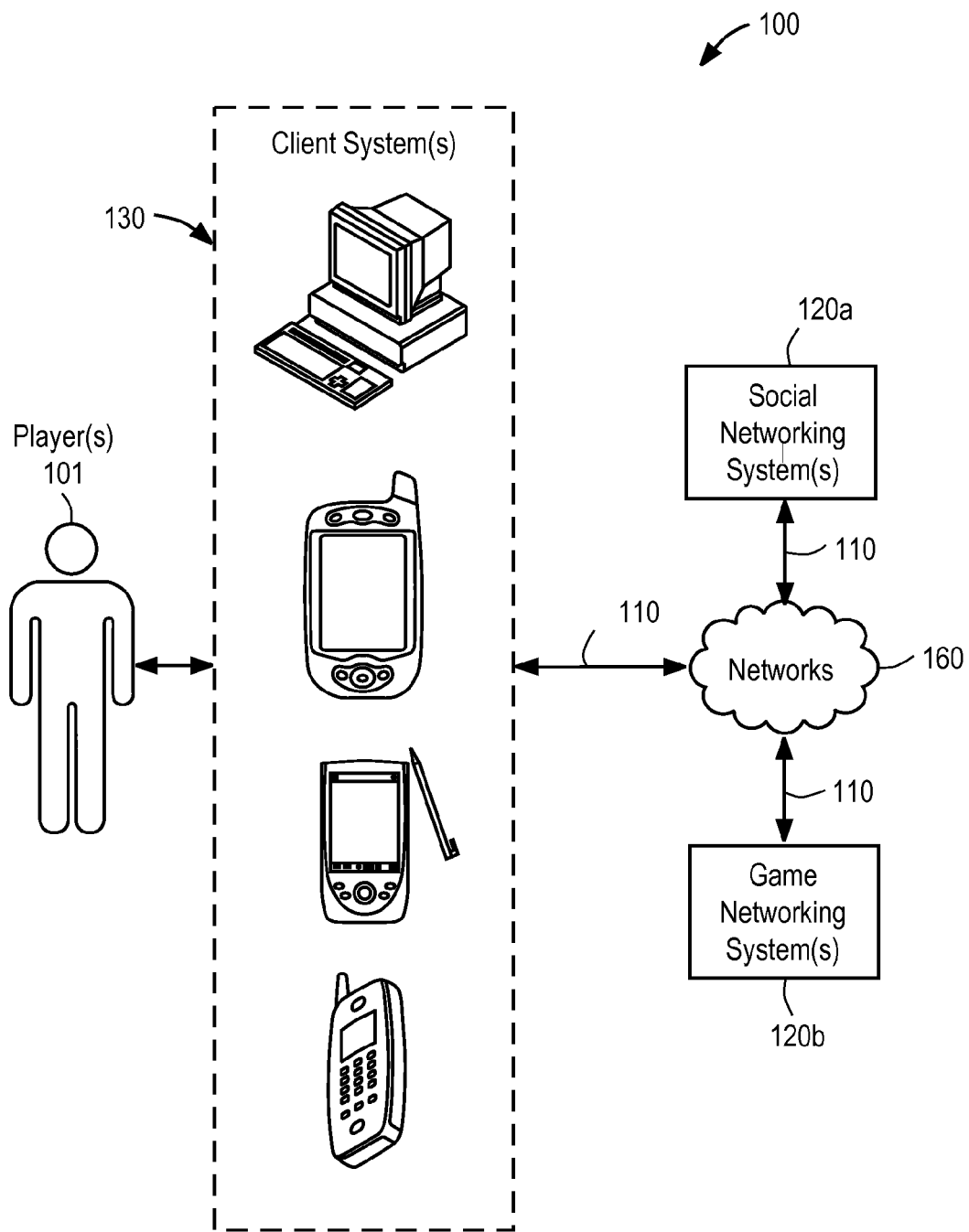
FIG. 1 is a block diagram illustrating an example of a system for implementing various disclosed embodiments.

FIG. 1 is a block diagram illustrating an example of a system 100 for implementing various disclosed embodiments. In particular embodiments, system 100 comprises player 101, social networking system 120a, game networking system 120b, client system 130, and network 160. The components of system 100 may be connected to each other in any suitable configuration and using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120a is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 may use client system 130 to access, send data to, and receive data from social networking system 120a and game networking system 120b. Client system 130 can access social networking system 120a or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, and the like.

Although FIG. 1 illustrates a particular number of players 101, social networking systems 120a, game networking systems 120b, client systems 130, and networks 160, this disclosure contemplates any suitable number of players 101, social networking systems 120a, game networking systems 120b, client systems 130, and networks 160. As an example and not by way of limitation, system 100 may include one or more game networking systems 120b and no social networking systems 120a. As another example and not by way of limitation, system 100 may include a system that comprises both social networking system 120a and game networking system 120b. Moreover, although FIG. 1 illustrates a particular arrangement of player 101, social networking system 120a, game networking system 120b, client system 130, and network 160, this disclosure contemplates any suitable arrangement of player 101, social networking system 120a, game networking system 120b, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)), optical (such as, for example, Synchronous Optical Network (SONET), or Synchronous Digital Hierarchy (SDH)) connections. In particular embodiments, one or more connections 110 each include one or more of an ad hoc network, an intranet, an extranet, a VPN, a LAN, a WLAN, a WAN, a WWAN, a MAN, a portion of the Internet, a portion of the PSTN, a cellular telephone network, another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120a, game networking system 120b, client system 130, and network 160, this disclosure contemplates any suitable connections between player 101, social networking system 120a, game networking system 120b, client system 130, and network 160. As an example and not by way of limitation, in particular embodiments, client system 130 may have a direct connection to social networking system 120a or game networking system 120b, thereby bypassing network 160.

Online Games and Game Systems
Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including NPCs and in-game objects. The game engine also manages game state, including player character state for currently active (online) and inactive (offline) players.

An online game can be hosted by game networking system 120b, which can be accessed using any suitable connection with a suitable client system 130. A player may have a game account on game networking system 120b, wherein the game account can contain a variety of information associated with the player (e.g., the player's personal information, financial information, purchase history, player character state, game state, etc.). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player 101 of an online game hosted on game networking system 120b. Game networking system 120b can determine that a player 101 is accessing the online game by reading the user's cookies, which may be appended to Hypertext Transfer Protocol (HTTP) requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, social networking system 120a, or game networking system 120b). As an example and not by way of limitation, client system 130 can download client components of an online game, which are executed locally, while a remote game server, such as game networking system 120b, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120b.

Game Systems, Social Networks, and Social Graphs

In an online multiplayer game, players may control player characters (PCs) and a game engine controls non-player characters (NPCs) and game features. The game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), and so forth. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is a copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure contemplates any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, social networking system 120a or game networking system 120b). In one embodiment, Nmax equals 1, such that the player's social network includes only first-degree friends. In another embodiment, Nmax is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game networking system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both. As used herein, the terms "player" and "user" can be used interchangeably and can refer to any user or character in an online multiuser game system or social networking system. As used herein, the term "friend" can mean any node within a player's social network.

Game Systems

A game event may be an outcome of an engagement, a provision of access, rights and/or benefits, or the obtaining of some assets (e.g., health, money, strength, inventory, land, etc.). A game engine determines the outcome of a game event according to a variety of factors, such as the game rules, a player character's in-game actions, player character state, game state, interactions of other player characters, and random calculations. Engagements can include simple tasks (e.g., plant a crop, clean a stove), complex tasks (e.g., build a farm or business, run a café), or other events.

An online game can be hosted by a game networking system 920b, which can be accessed over any suitable network with an appropriate client system 930. A player may have a game system account on game networking system 920b, wherein the game system account can contain a variety of information about the player (e.g., the player's personal information, player character state, game state, etc.). In various embodiments, an online game can be embedded into a third-party website. The game can be hosted by the networking system of the third-party website, or it can be hosted on game networking system 920b and merely accessed via the third-party website. The embedded online game can be hosted solely on a server of game networking system 920b or using a third-party vendor server. In addition, any combination of the functions of the present disclosure can be hosted on or provided from any number of distributed network resources. For example, one or more executable code objects that implement all or a portion of the game can be downloaded to a client system for execution.

Virtual Currency

In various embodiments, players within the game can acquire virtual currency. In such games, the virtual currency might be represented by virtual coins, virtual cash, or by a number or value stored by the server for that player's benefit. Such virtual currency represents units of value for use in the online game system and is analogous to legal currency. Virtual currency can be purchased in one or more actual cash or credit transactions by a player, where the legal currency is transferred using a credit/debit/charge card transaction conveyed over a financial network. In some embodiments, a player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

In some embodiments, virtual currency can be used to purchase one or more in-game assets or other benefits. For example, a player may be able to exchange virtual currency for a desired level, access, right, or item in an online game. In one embodiment, legal currency can be used to directly purchase an in-game asset or other benefit. The player can select the desired in-game asset or other benefit. Once appropriate selections are made, the player can place the order to purchase the in-game asset or other benefit. This order is received by the game networking system 920b, which can then process the order. If the order is processed successfully, an appropriate financial account associated with the player can be debited by the amount of virtual currency or legal currency needed to buy the selected in-game asset or other benefit.

In some embodiments, multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. In some implementations, virtual cash may also be awarded for leveling up in the game.

Communication Systems

Systems for managing communications between the various client systems 130 and other systems, such as the game networking system 120b, may be used or selected based on differences between the client systems 130. For example, a mobile device communicating with the game networking system 120b via a first client application executing on the Apple iOS operating system or the Open Handset Alliance Android operating system may select a different system for handling communications than a personal computer device that communicates with the game networking system 120b via a second client application, such as a web browser or an application executing within the web browser, executing on a Windows operating system. The system for managing communications may be selected or used based on various other factors, such as a type of network over which the client system 130 is connected (e.g., a wireless network or a wired network) or attributes of the client system 130, such as a number of communication channels that are available on the client system 130 for transmitting or receiving communications.

In communications between a mobile device and a server, every network hit may be a liability. A hit is not the payload that is being sent, but rather the process of asking for the payload to be sent (e.g., the process of spinning up a network connection, transmitting data, and receiving a response to the transmitted data). For example, in terms of a performance of the system 100, it may not matter whether a client is asking for 15 or 150 responses from a server as much as it matters how many times the client asks for those 15 or 150 things. By batching transactions into configurable, structured groups as described herein, a performance of the system 100 as a whole may be improved. For example, the impact of playing a game on the performance of the client system 130 may be reduced by saving the client system 130 the resources that would be involved in managing individual transactions back and forth across the network.

Figure 2A:
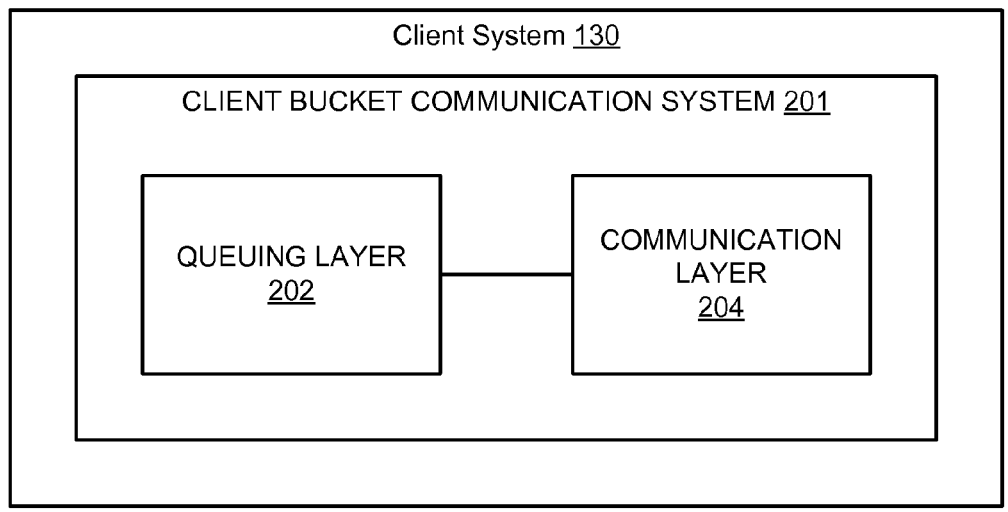
FIG. 2a is a block diagram illustrating an example embodiment of a client system that is configured to communicate with an external system, such as a game networking system.

FIG. 2a is a block diagram illustrating an example embodiment of a client system 130 that is configured to communicate with an external system, such as the game networking system 120b. The client system 130 includes a client bucket communication system 201 that is configured to send buckets (e.g., arrays) of communications to and receive buckets of communications from the external system. The client bucket communication system 201 includes a queuing layer 202 that is configured to receive requests from and send communications to an application executing on the external system. The requests may be received by the queuing layer 202 from modules of an application executing on the client system 130. The queuing layer 202 is further configured to distribute responses received from the external system back to the modules from which the corresponding requests were received.

The client bucket communication system 201 also includes a communication layer 204 that is configured to select communications received by the queuing layer 202 and assemble them into buckets (e.g., request buckets). The communication layer 204 then sends the buckets to the external system. The communication layer 204 is also configured to receive buckets of communications from the external system (e.g., response buckets, which may include communications that respond to communications contained in a previous bucket of communications sent by the communication layer 204). The communication layer may disassemble buckets received from the external system into individual communications (e.g., responses) that the queuing layer 202 may distribute back to the modules of the application from which the corresponding requests were received.

Figure 2B:
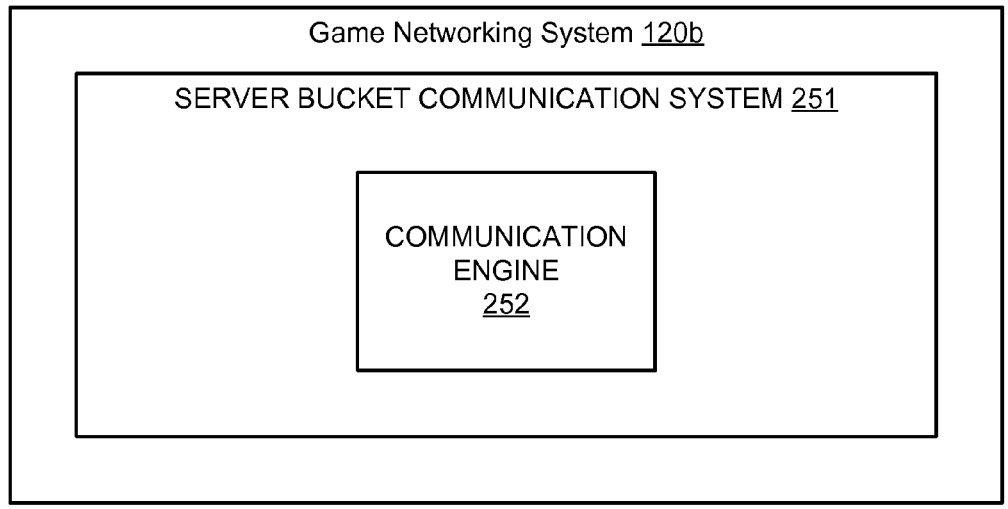
FIG. 2b is a block diagram illustrating an example embodiment of a game networking system that is configured to communicate with an external system, such as a client system.

FIG. 2b is a block diagram illustrating an example embodiment of game networking system 120b that is configured to communicate with an external system, such as the client system 130. The game networking system 120b includes a server bucket communication system 251 that is configured to send communications to and receive communication from the external system. The server bucket communication system 251 includes a communication engine 252 that is configured to receive buckets of communications from the external system, disassemble the buckets of communications into individual communications (e.g., requests), and send the requests to applications (e.g., one or more games) executing on the game networking system 120b to process the requests. The communication engine 252 is configured to receive responses to the requests from the applications executing on the game networking system 120b and assemble the responses into buckets (e.g., response buckets containing communications that respond to communication sent by the external system).

For example, while the communication layer 204 is waiting for an application executing on an external system to send responses to communications sent in a previous bucket, the communication layer 204 may select messages having a first priority from a queue of messages received by the queuing layer 202 and place the selected messages into open slots of a next bucket of communications. Then, upon receiving the responses to the communication sent in a previous bucket of communications, the client bucket communication system 201 may select additional messages from the queue of messages received by the queuing layer 202, with the additional messages having a second priority that is lower than the first priority, to fill up as many of the remaining slots of the next bucket of communications as possible. The communication module 201 may then send the next bucket of communications to the application executing on the external system. The communication module may then repeat this process, selecting additional messages from the queue of messages received by the queuing layer and placing the additional messages into the slots of another bucket.

Figure 3:
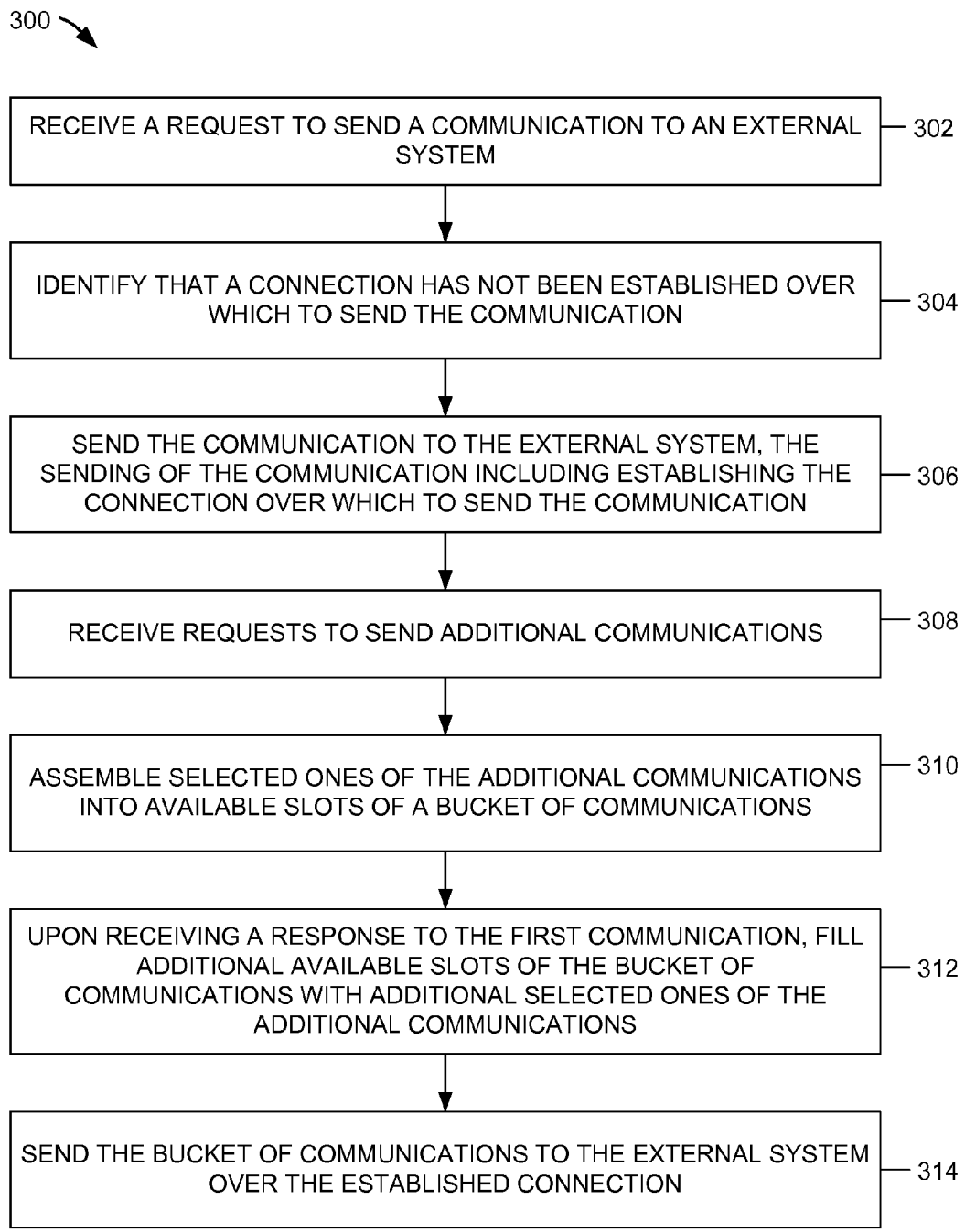
FIG. 3 is a flowchart illustrating an example embodiment of a method of sending buckets of communications.

FIG. 3 is a flowchart illustrating an example embodiment of a method 300 of sending buckets of communications. In various embodiments, the method 300 may be implemented by the client bucket communication system 201. At operation 302, the queuing layer 202 receives a request to send a communication to an external system. The communication may be a request that an application executing on the external system perform an action, such as update a record in a database, or send information pertaining to the application.

At operation 304, the communication layer 204 identifies that a connection (e.g., a TCP/IP connection) has not been established over which to send the communication. In other words, the communication layer 204 identifies that the communication is a "first" communication that is being sent to the external system (e.g., for a particular session).

At operation 306, the communication layer 204 sends the communication to the external system based on the identification that the connection over which to send the communication has not been established. This operation of sending the communication includes establishing the connection over which to send the communication. By sending this first communication immediately, the communication layer 204 primes the connection to handle transmissions of buckets of communications that are to follow. The priming of the connection may include actions such as resolving where the host is, translating between domain names (e.g., "google.com") and IP addresses, and determining the bandwidth and speed of the connection between the device and the infrastructure (e.g., cellular phone towers) through which the device is communicating. Because this priming of the connection may include a ramp up (or spin-up) time, this sending of the first communication immediately may improve the efficiency of the system 100 in comparison to sending the first communication with a bucket of communication. For example, the communication layer 204 may prevent a bottleneck that may result from causing the system 100 to not only deal with the spinning up of the network connection, but also responding to a bucket of communications, which would likely have a larger combined payload than the payload of the first communication by itself. In other words, because data payload of the first communication is comparatively smaller than subsequent data payloads, the data transmission plus the connection ramp up is enabled to occur as quickly as possible.

At operation 308, the queuing layer 202 receives requests to send additional communications. For example, the queuing layer 202 receives requests from multiple modules of an application executing on the client system 130, such as the modules of an application corresponding to the user interface elements depicted in FIGS. 7 and 8.

At operation 310, the communication layer 204 assembles selected ones of the additional communications into available slots of a bucket (e.g., an array) of communications. The communication layer 204 may select the ones of the additional communications based on the ones of the additional communications having a higher priority than other ones of the additional communications. For example, the communication layer 204 may select requests to update a database with user state information, requests from a user to purchase an item, or other requests for which an application (e.g., a game) must provide a response. These selections may be based on the priority of such messages being higher than the priorities of other messages. An example of a request having a lower priority may be requests to provide tracking data that records user actions with respect to an application executing on the client system 130 that the application executing on the game networking system 120*b* may analyze to draw conclusions about an engagement of the user of the client system 130 with the application executing on the client system 130 or the application executing on the game networking system 120*b*.

At operation 312, upon receiving a response to the first communication, the communication layer 204 may fill additional available slots of the bucket of communication with additional selected ones of the additional communications. In some embodiments, the number of slots in the bucket is variable. For example, the number of slots in the bucket may depend on the determined speed and/or bandwidth of the connection. In other embodiments, the number of slots in the bucket is fixed, or the number of slots may be configurable based on input from an administrator or an external system. The communication layer 204 may select the additional ones of the additional communications based on their priority. Or the communication layer 204 may simply select all of the additional communications based on, for example, a count of the additional communications being less than a count of the remaining available slots in the bucket of communications. Or the communication layer 204 may select the additional communications based on other criteria, such as an order in which the queuing layer received the requests to send the communications from an application executing on the client system 130.

For example, in various embodiments, priority levels associated with communications are used to determine which communications are taken from the queue (received by the queuing layer 202) and placed into the bucket (by the communication layer 204) during various stages of a communications process. In various embodiments, while the communication layer 204 is waiting for responses corresponding to communications sent in a previous bucket, the communication layer 204 places only communications having the highest priority into the bucket. In various embodiments, in a brief period of time after the communication layer 204 receives the responses and before the communication layer sends out the next bucket, the communication layer 204 attempts to fill up the bucket with communications having lower priorities.

At operation 314, the communication layer 204 sends the bucket of communications to the external system over the established connection. The communication layer 204 may use just a single communication channel (or pipe) of multiple communications channels of the client system 130 such that the other channels may remain open to the device to process other communications. For example, if the application executing on the client system 130 is a game, by using a single channel to handle communications related to the game, the communication layer 204 leaves the other channels of the device open for handling other communications related to other applications, such as email applications, chat applications, music streaming applications, and so on. Furthermore, using a single communication channel may prevent a spider-like web of communications from having to be received and processed in parallel by an application executing on the server, which, in various environments (e.g., in a Java environment), may slow down the responsiveness of a user interface of an application.

Figure 4:
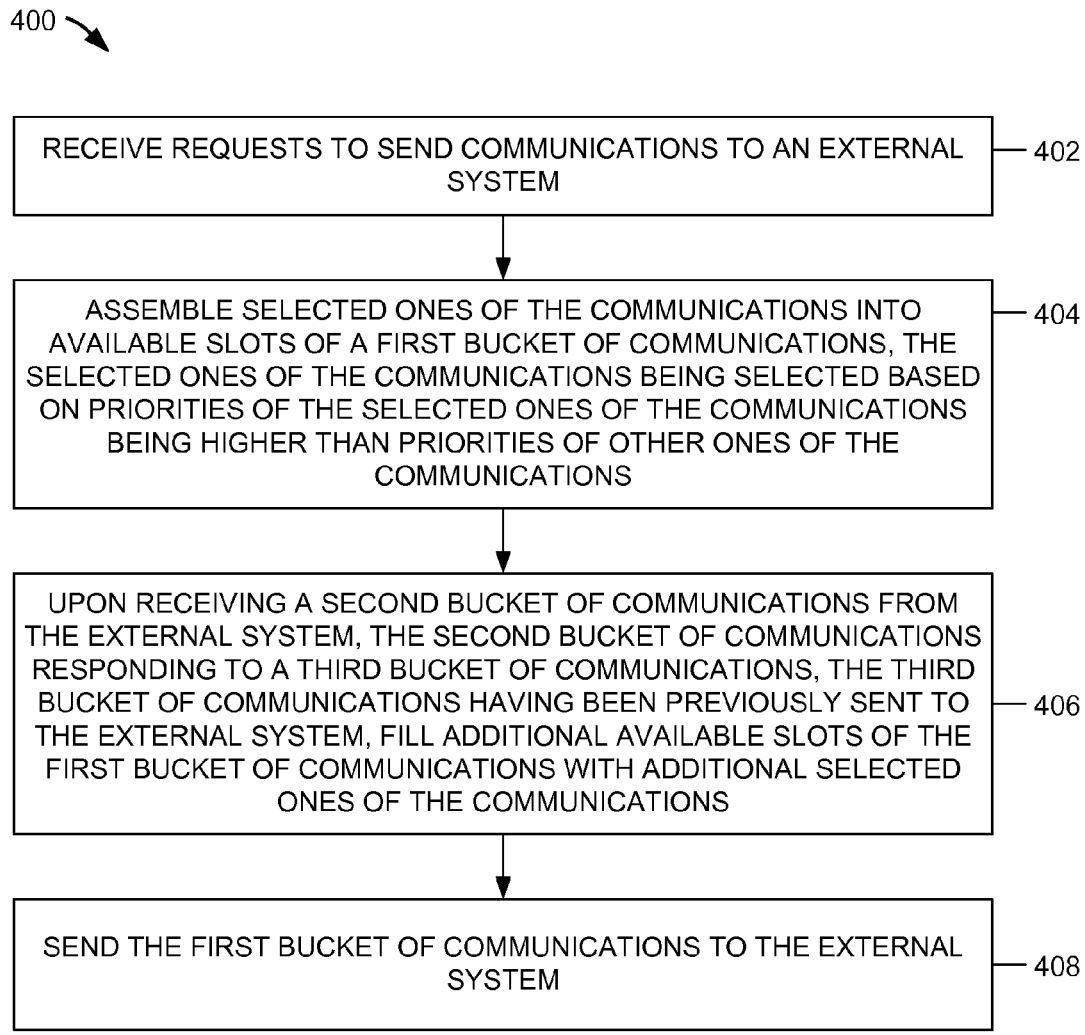
FIG. 4 is a flowchart illustrating an example embodiment of a method of managing buckets of communications.

FIG. 4 is a flowchart illustrating an example embodiment of a method 400 of managing buckets of communications. In various embodiments, the method 400 may be implemented by the client bucket communication system 201. At operation 402, the queuing layer 202 receives requests to send communications to an external system.

At operation 404, the communication layer 204 assembles selected ones of the communications into available slots of a first bucket of communications. As described with respect to FIG. 3, the communication layer 204 may select the selected ones of the communications based on priorities of the selected ones of the communications being higher than priorities of other ones of the communications.

At operation 406, upon receiving a second bucket of communications from the external system, the communication layer 204 fills additional available slots of the first bucket of communications with additional selected ones of the communications (e.g., based on priority or other criteria, as described with respect to FIG. 3). The second bucket of communications may be received as a response to a third bucket of communications, with the third bucket of communications having been previously sent to the external system.

At operation 408, the communication layer 204 sends the first bucket of communications to the external system as described above with respect to FIG. 3.

Figure 5:
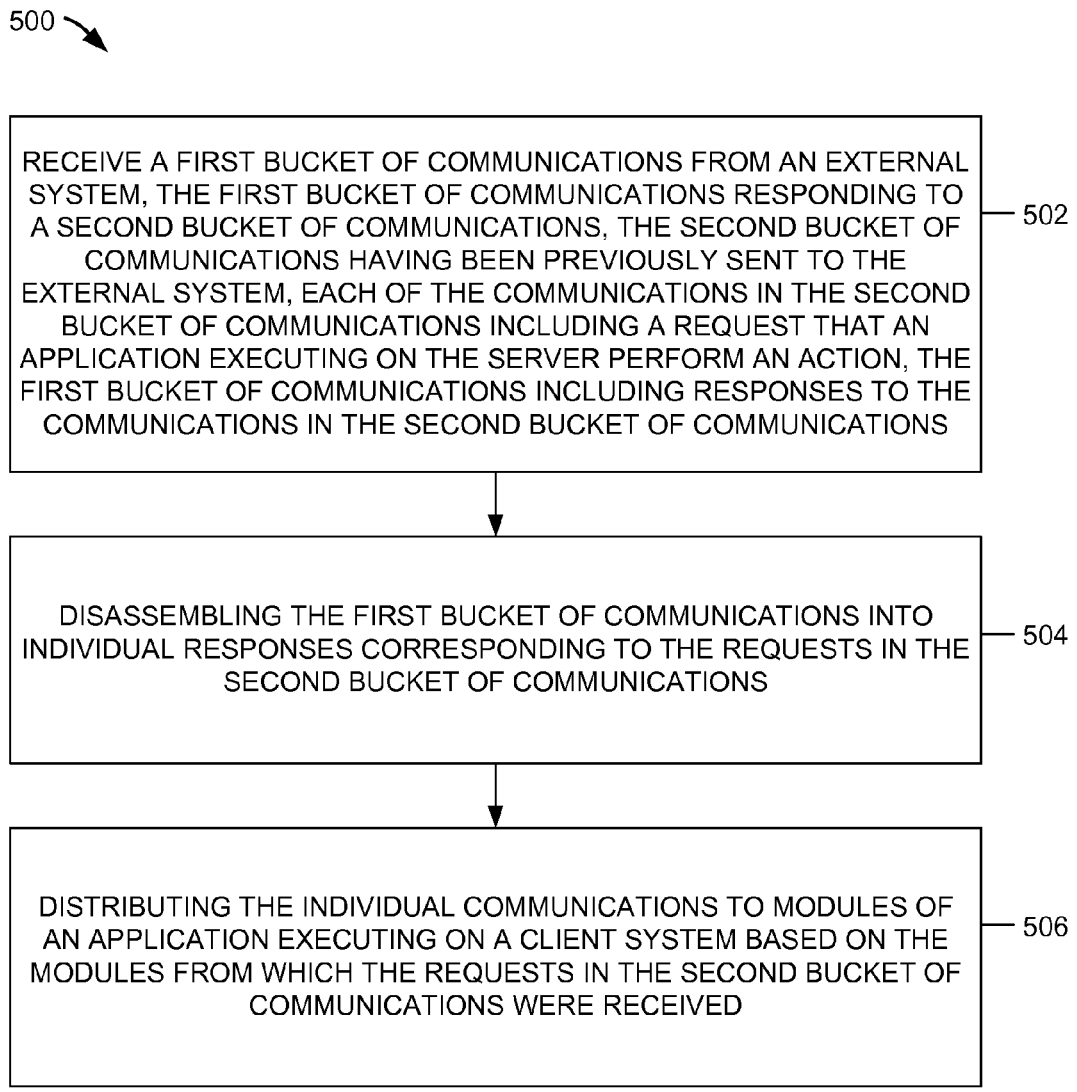
FIG. 5 is a flowchart illustrating an example embodiment of a method of receiving a bucket of communications.

FIG. 5 is a flowchart illustrating an example embodiment of a method 500 of receiving a bucket of communications. In various embodiments, the method 500 may be implemented by the client bucket communication system 201. At operation 502, the communication layer 204 receives a first bucket of communications from an external system. This first bucket of communications may be a response from the external system to a second bucket of communications. The second bucket of communications may have been previously sent to the external system from the communication layer 204. Each of the communications in the second bucket of communication may include a request that an application executing on the server perform an action. The first bucket may include responses corresponding to the requests included in the second bucket of communications.

At operation 504, the communication layer 204 may disassemble the first bucket of communications into individual responses corresponding to the requests in the second bucket of communications.

At operation 506, the queuing layer 202 may distribute the individual communications to modules of an application executing on the client system 130 based on the modules from which the requests in the second bucket of communications were received.

Figure 6:
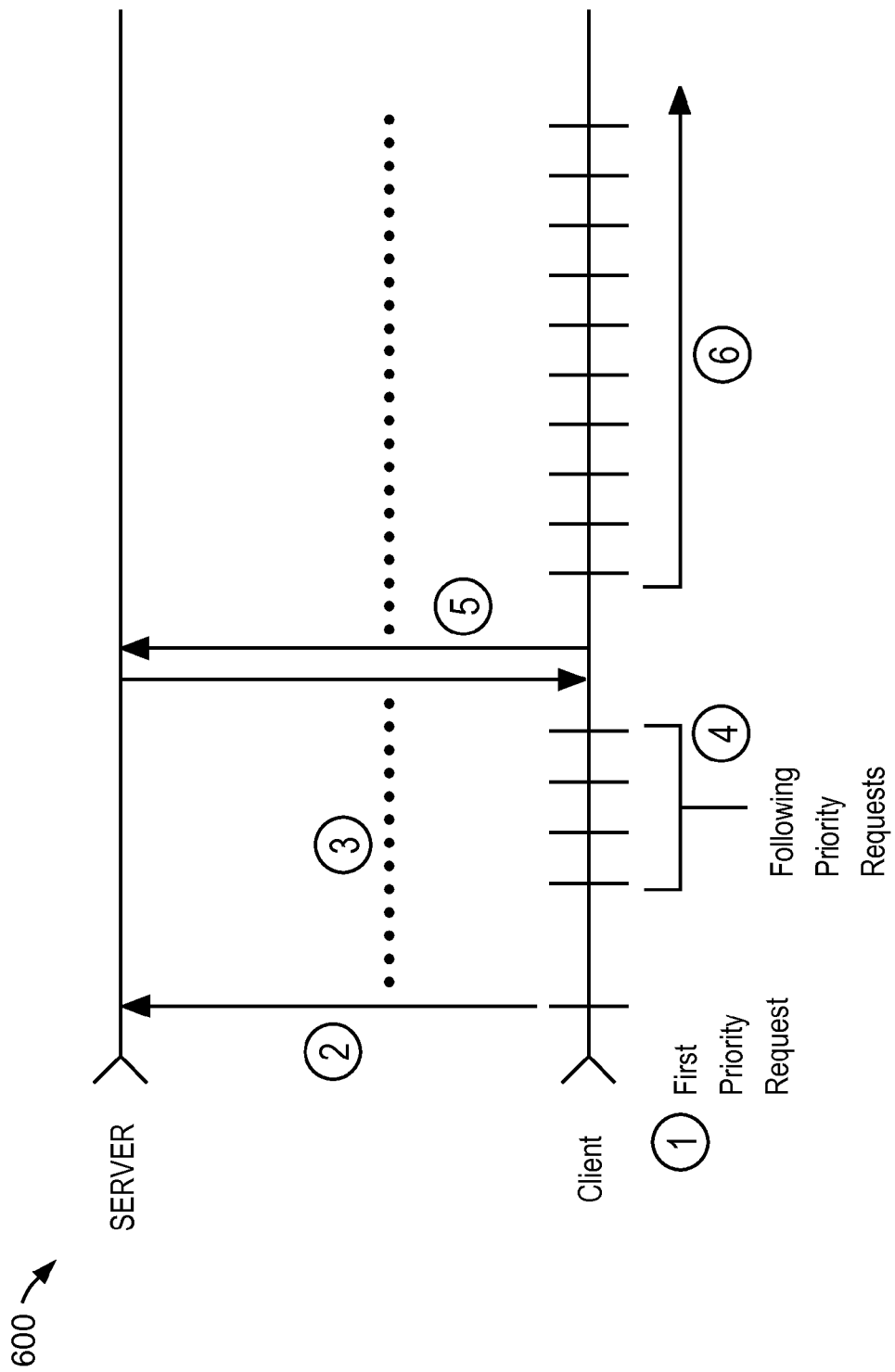
FIG. 6 is an interaction diagram illustrating example operations performed by a client system and a game networking system to process buckets of communications.

FIG. 6 is an interaction diagram illustrating example operations 600 performed by the client system 130 and the game networking system 120*b* to process buckets of communications. At 1, the queuing layer 202 receives a request from an application layer to send a communication to a server. At 2, based on this request being the first request, the communication layer 204 sends out this request immediately. At 3, the server processes the first request. At 4, while the request is being processed by the server, the communication layer 204 places additional requests received by the queuing layer into a bucket of communications (e.g., based on priorities of the communications). At 5, upon receiving a response to the first communication, the communication layer flushes the bucket of communications immediately. Thus, communications between the client system 130 and the game networking system 120*b* are processed as quickly as possible based on the limitations of the systems 130 and 120*b* or an underlying transport layer of the connection that handles the sending and receiving of the buckets of communications.

Figure 7:
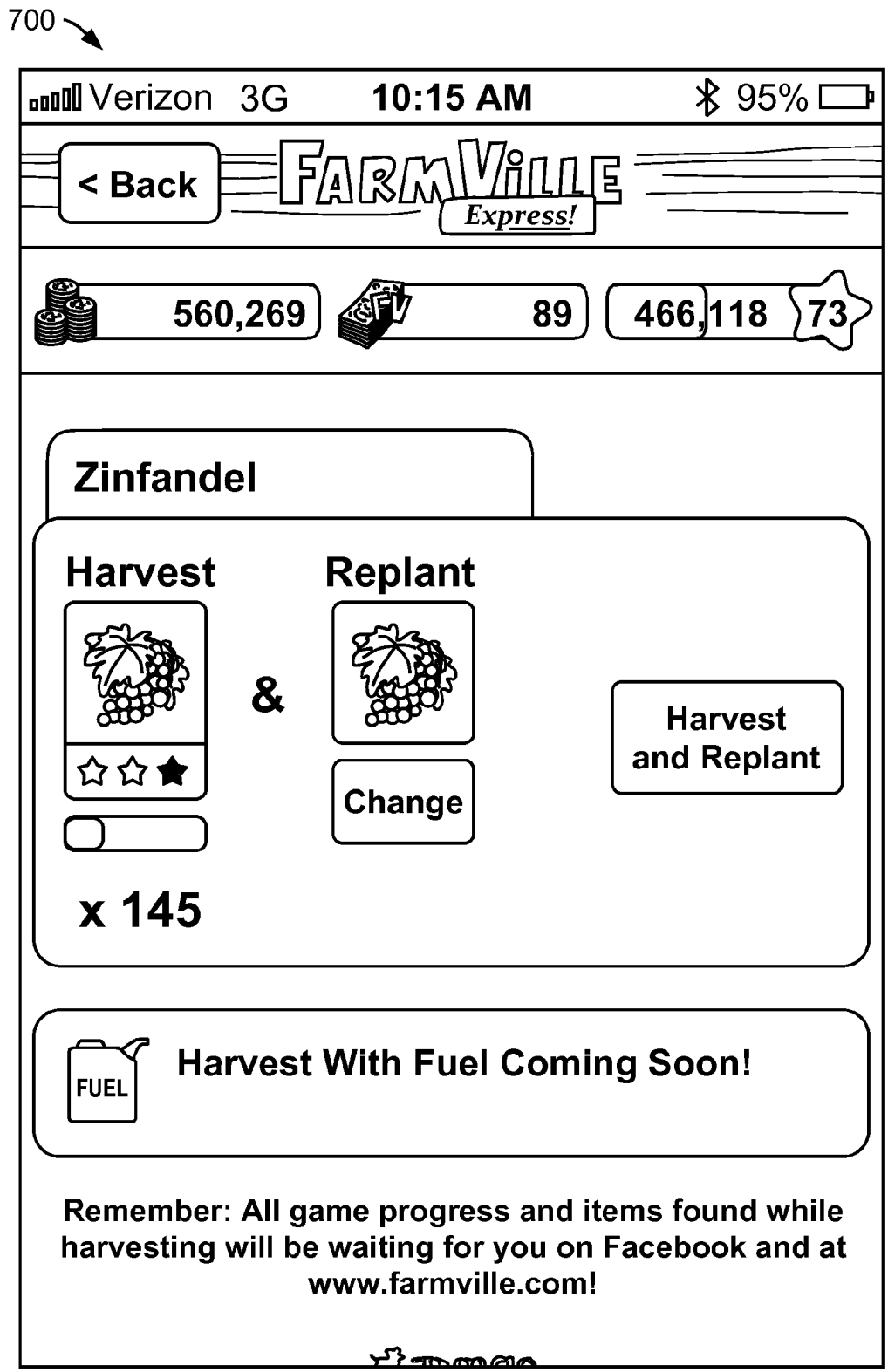
FIG. 7 is an example embodiment of a user interface of an application executing on a client system.

FIG. 7 is an example embodiment of a user interface 700 of an application executing on the client system 130. The user interface 700 includes various user interface elements with which a user of the application may interact. Upon detecting an interaction by the user with a user interface element, such as the user pressing a "Harvest and Replant" button, the client application sends a request to the queuing layer to send a communication to the server to send more information pertaining to harvesting and replanting crops from an application executing on the game networking system 120*b*. The communication layer 204 then consumes the communication from a queue maintained by the queuing layer 202 and transmits the communication to the server immediately (e.g., if it is a first communication of a session) or includes the communication in a bucket of communications to be sent (e.g., in a serial fashion) to the application executing on the game networking system 120*b*. The application executing on the client system 130 then receives a response to the communication from the queuing layer based on a disassembly of a response bucket from the server and an association of a response in the response bucket to the application.

Figure 8:
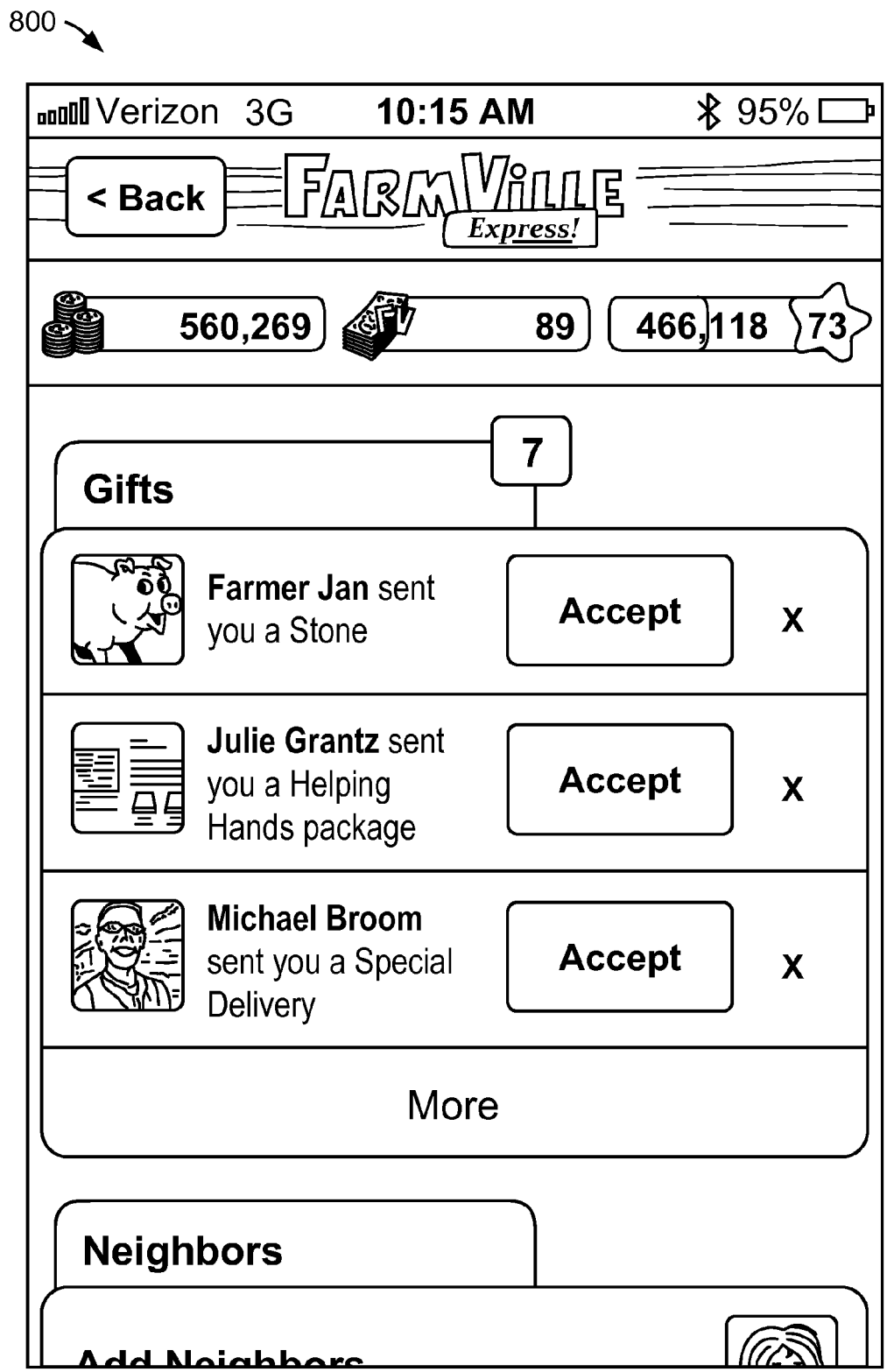
FIG. 8 is an example embodiment of a user interface of an application executing on client system.

FIG. 8 is an example embodiment of a user interface 800 of an application executing on client system 130. The user interface 800 includes various user interface elements with which a user of the application may interact. Upon detecting an interaction by the user with a user interface element, such as the user pressing an "Accept" button (to accept gifts sent to the user by other users of a game), the client application sends a request to the queuing layer 202 to send a communication to the server to update the game based on the acceptance by the user of a gift. The communication layer 204 then consumes the communication from a queue maintained by the queuing layer 202 and transmits the communication to the server immediately (e.g., if it is a first communication of a session) or includes the communication in a bucket of communications to be sent (e.g., in a serial fashion) to the application executing on the game networking system 120*b*. The application executing on the client system 130 then receives a response to the communication from the queuing layer 202 based on a disassembly of a response bucket from the server and an association of a response in the response bucket to the application.

In various embodiments, the user interface may correspond to multiple modules of an application executing on the client system 130 and each module may send requests in parallel to the queuing layer 202 for processing.

Game Interfaces

In various embodiments, a user 101 of a client system 130 can use a browser client (e.g., Firefox, Chrome, Internet Explorer, etc.) to access the online game over the Internet (or other suitable network). For example, the game interface 700 illustrated in FIG. 7 may be automatically generated and presented to the user in response to the user visiting or accessing the game operator's website or a third-party's website from client system 130 with a browser client. Game networking system 120*b* can transmit data to client system 130, thereby allowing it to display game interface 700, which is typically some type of graphic user interface. For example, the webpage downloaded to client system 130 may include an embedded call that causes client system 130 to download an executable object, such as a Flash .SWF object, which executes on client system 130 and renders the game within the context of the webpage. Other interface types are possible, such as server-side rendering and the like. Game interface 1200 is configured to receive signals from the user 101 via client system 130. For example, the user 101 can click on game interface 700 or enter commands from a keyboard or other suitable input device. The game engine can respond to these signals to allow game play. The display of game interface 700 can change based on the output of the game engine, the input of the player, and other signals from game networking system 120*b* and client system 130.

The game interface 700 can display various game components, such as the game environment, options available to the player (e.g., in-game actions, preferences, settings, etc.), game results, and so forth. Some components of the game interface may be static, while others may be dynamic (e.g., changing with game play). The user may be able to interact with some components (e.g., player character, NPCs, virtual objects, etc.) and not interact with other components (e.g., the background of the virtual world, such as the virtual street or sidewalk). The user can engage in specific in-game actions or activities by providing input to game interface 1200.

The user can also click on various user interface elements in game interface 700 to activate various game options.

One skilled in the art would appreciate that FIG. 7 is presented merely as an example of an embodiment of one type of online game and that the present disclosure is intended to encompass a variety of game types, including gambling games, role-playing games, puzzle games, and the like.

Data Flow

Figure 9:
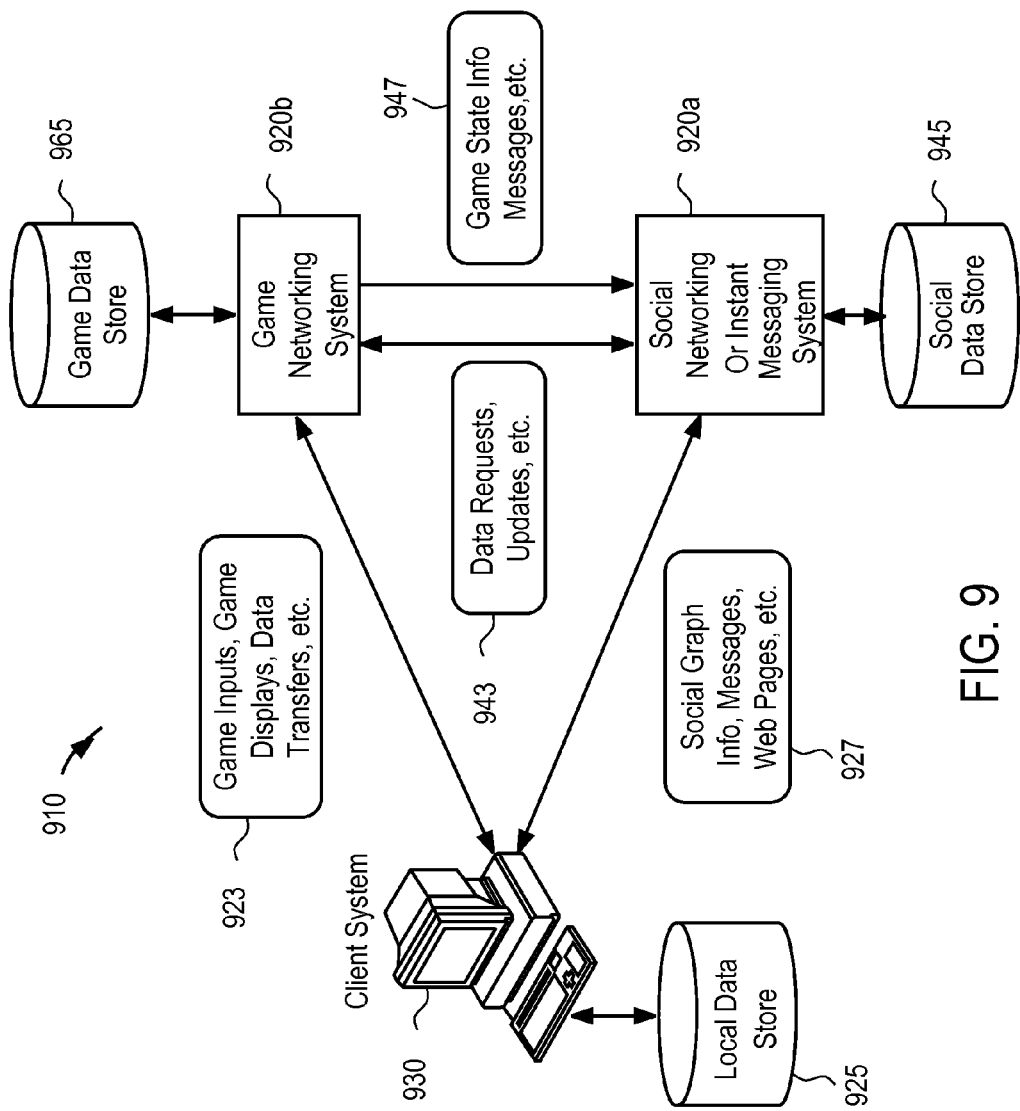
FIG. 9 is a block diagram illustrating an example data flow between the components of a system.

FIG. 9 is a block diagram illustrating an example data flow between the components of system 910. In particular embodiments, system 910 can include client system 930, social networking system 920*a*, and game networking system 920*b*. The components of system 910 can be connected to each other in any suitable configuration and using any suitable type of connection. The components may be connected directly or over any suitable network. Client system 930, social networking system 920*a*, and game networking system 920*b* can each have one or more corresponding data stores such as local data store 925, social data store 945, and game data store 965, respectively. Social networking system 920*a* and game networking system 920*b* can also have one or more servers that can communicate with client system 930 over an appropriate network. Social networking system 920*a* and game networking system 920*b* can have, for example, one or more Internet servers for communicating with client system 930 via the Internet. Similarly, social networking system 920*a* and game networking system 920*b* can have one or more mobile servers for communicating with client system 930 via a mobile network (e.g., GSM, PCS, Wi-Fi, WPAN, etc.). In some embodiments, one server may be able to communicate with client system 930 over both the Internet and a mobile network. In other embodiments, separate servers can be used.

Client system 930 can receive and transmit data 923 to and from game networking system 920*b*. This data can include, for example, webpages, messages, game inputs, game displays, HTTP packets, data requests, transaction information, updates, and other suitable data. At some other time, or at the same time, game networking system 920*b* can communicate data 943, 947 (e.g., game state information, game system account information, page info, messages, data requests, updates, etc.) with other networking systems, such as social networking system 920*a* (e.g., Facebook, Myspace, etc.). Client system 930 can also receive and transmit data 927 to and from social networking system 920*a*. This data can include, for example, webpages, messages, social graph information, social network displays, HTTP packets, data requests, transaction information, updates, and other suitable data.

Communication between client system 930, social networking system 920*a*, and game networking system 920*b* can occur over any appropriate electronic communication medium or network using any suitable communications protocols. For example, client system 930, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HTML documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 920*b*, the BLOB containing the game state for the instance corresponding to the player can be transmitted to client system 930 for use by a client-side executed object to process. In particular embodiments, the client-side executable may be a Flash-based game, which can de-serialize the game state data in the BLOB. As a player plays the game, the game logic implemented at client system 930 maintains and modifies the various game state parameters locally. The client-side game logic may also batch game events, such as mouse clicks, and transmit these events to game networking system 920*b*. Game networking system 920*b* may itself operate by retrieving a copy of the BLOB from a database or an intermediate memory cache (memcache) layer. Game networking system 920*b* can also de-serialize the BLOB to resolve the game state parameters and execute its own game logic based on the events in the batch file of events transmitted by the client to synchronize the game state on the server side. Game networking system 920*b* may then re-serialize the game state, now modified, into a BLOB and pass this to a memory cache layer for lazy updates to a persistent database.

With a client-server environment in which the online games may run, one server system, such as game networking system 920*b*, may support multiple client systems 930. At any given time, there may be multiple players at multiple client systems 930 all playing the same online game. In practice, the number of players playing the same game at the same time may be very large. As the game progresses with each player, multiple players may provide different inputs to the online game at their respective client systems 930, and multiple client systems 930 may transmit multiple player inputs and/or game events to game networking system 920*b* for further processing. In addition, multiple client systems 930 may transmit other types of application data to game networking system 920*b*.

In particular embodiments, a computed-implemented game may be a text-based or turn-based game implemented as a series of web pages that are generated after a player selects one or more actions to perform. The web pages may be displayed in a browser client executed on client system 930. As an example and not by way of limitation, a client application downloaded to client system 930 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 920*a*. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 930, either caused by an action of a game player or by the game logic itself, client system 930 may need to inform game networking system 920*b* of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 910 is discussed in reference to updating a multi-player online game hosted on a network-addressable system (such as, for example, social networking system 920*a* or game networking system 920*b*), where an instance of the online game is executed remotely on a client system 930, which then transmits application event data to the hosting system such that the remote game server synchronizes the game state associated with the instance executed by the client system 930.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 930 may include a Flash client. The Flash client may be configured to receive and run Flash applications or game object codes from any suitable networking system (such as, for example, social networking system 920a or game networking system 920b). In particular embodiments, the Flash client may be run in a browser client executed on client system 930. A player can interact with Flash objects using client system 930 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 930, the Flash client may send the events that caused the game state changes to the in-game object to game networking system 920b. However, to expedite the processing and hence the speed of the overall gaming experience, the Flash client may collect a batch of some number of events or updates into a batch file. The number of events or updates may be determined by the Flash client dynamically or determined by game networking system 920b based on server loads or other factors. For example, client system 930 may send a batch file to game networking system 920b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 930. In particular embodiments, the batch file may be a text file, and the name-value pairs may be in string format.

In particular embodiments, when a player plays an online game on client system 930, game networking system 920b may serialize all the game-related data, including, for example and without limitation, game states, game events, and user inputs, for this particular user and this particular game into a BLOB and store the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 920b may retrieve the corresponding BLOB from the database to determine the most-recent values of the game-related data. In particular embodiments, while a player is playing the online game, game networking system 920b may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 10:
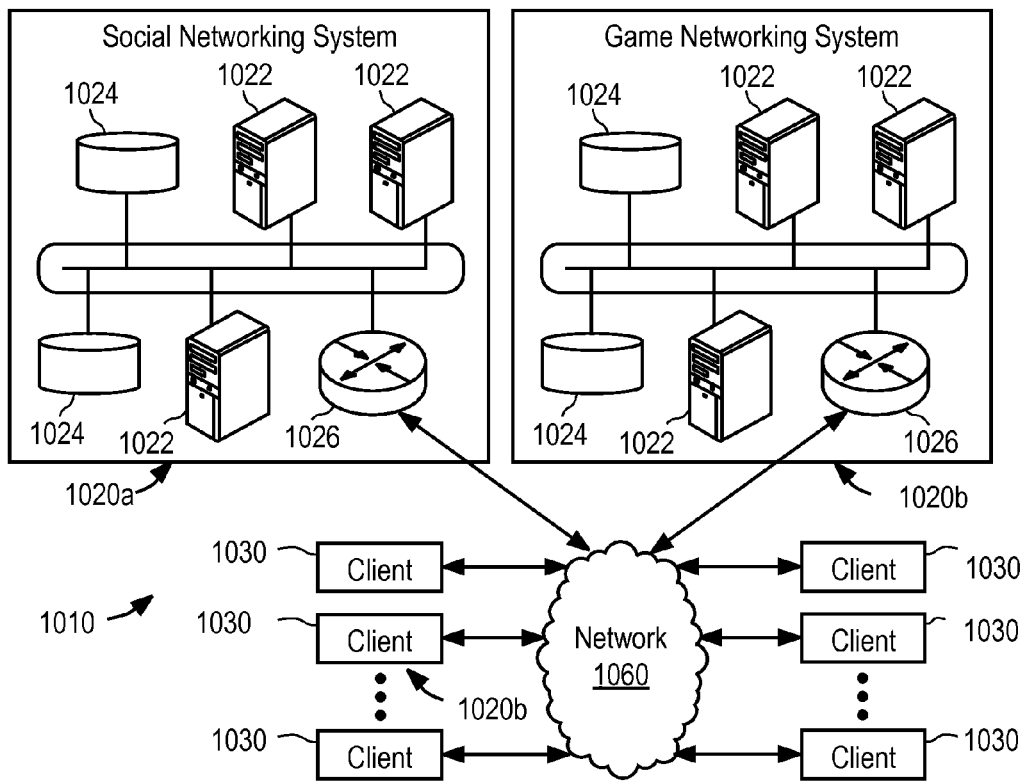
FIG. 10 is a block diagram illustrating an example network environment in which various example embodiments may operate.

Particular embodiments may operate in a wide area network (WAN) environment, such as the Internet, including multiple network addressable systems. FIG. 10 is a block diagram illustrating an example network environment 1010 in which various example embodiments may operate. Network cloud 1060 generally represents one or more interconnected networks, over which the systems and hosts described herein can communicate. Network cloud 1060 may include packet-based WANs (such as the Internet), private networks, wireless networks, satellite networks, cellular networks, paging networks, and the like. As FIG. 10 illustrates, particular embodiments may operate in a network environment comprising one or more networking systems, such as social networking system 1020a, game networking system 1020b, and one or more client systems 1030. The components of social networking system 1020a and game networking system 1020b operate analogously; as such, hereinafter they may be referred to simply as networking system 1020. Client systems 1030 are operably connected to the network environment via a network service provider, a wireless carrier, or any other suitable means.

Networking system 1020 is a network addressable system that, in various example embodiments, comprises one or more physical servers 1022 and data stores 1024. The one or more physical servers 1022 are operably connected to computer network 1060 via, by way of example, a set of routers and/or networking switches 1026. In an example embodiment, the functionality hosted by the one or more physical servers 1022 may include web or HTTP servers, FTP servers, or application servers, as well as, without limitation, webpages and applications implemented using Common Gateway Interface (CGI) script, Hyper-text Preprocessor (PHP), Active Server Pages (ASP), HTML, XML, Java, JavaScript, Asynchronous JavaScript and XML (AJAX), Flash, ActionScript, and the like.

Physical servers 1022 may host functionality directed to the operations of networking system 1020. Hereinafter servers 1022 may be referred to as server 1022, although server 1022 may include numerous servers hosting, for example, networking system 1020, as well as other content distribution servers, data stores, and databases. Data store 1024 may store content and data relating to, and enabling, operation of networking system 1020 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, and the like. Logically, data store 1024 corresponds to one or more of a variety of separate and integrated databases, such as relational databases and object-oriented databases, that maintain information as an integrated collection of logically related records or files stored on one or more physical systems. Structurally, data store 1024 may generally include one or more of a large class of data storage and management systems. In particular embodiments, data store 1024 may be implemented by any suitable physical system(s) including components, such as one or more database servers, mass storage media, media library systems, storage area networks, data storage clouds, and the like. In one example embodiment, data store 1024 includes one or more servers, databases (e.g., MySQL), and/or data warehouses. Data store 1024 may include data associated with different networking system 1020 users and/or client systems 1030.

Client system 1030 is generally a computer or computing device including functionality for communicating (e.g., remotely) over a computer network. Client system 1030 may be a desktop computer, laptop computer, personal digital assistant (PDA), in- or out-of-car navigation system, smart phone or other cellular or mobile phone, or mobile gaming device, among other suitable computing devices. Client system 1030 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 1030 to enter addresses of specific network resources to be retrieved, such as resources hosted by networking system 1020. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 1030 desires to view a particular webpage (hereinafter also referred to as a target structured document) hosted by networking system 1020, the user's web browser, or other document rendering engine or suitable client application, formulates and transmits a request to networking system 1020. The request generally includes a URL or other document identifier as well as metadata or other information. By way of example, the request may include information identifying the user, such as a user identifier (ID), as well as information identifying or characterizing the web browser or operating system running on the user's client computing device 1030. The request may also include location information identifying a geographic location of the user's client system or a logical network location of the user's client system. The request may also include a timestamp identifying when the request was transmitted.

Although the example network environment 1010 described above and illustrated in FIG. 10 is described with respect to social networking system 1020$a$ and game networking system 1020$b$, this disclosure encompasses any suitable network environment using any suitable systems. As an example and not by way of limitation, the network environment may include online media systems, online reviewing systems, online search engines, online advertising systems, or any combination of two or more such systems.

Figure 11:
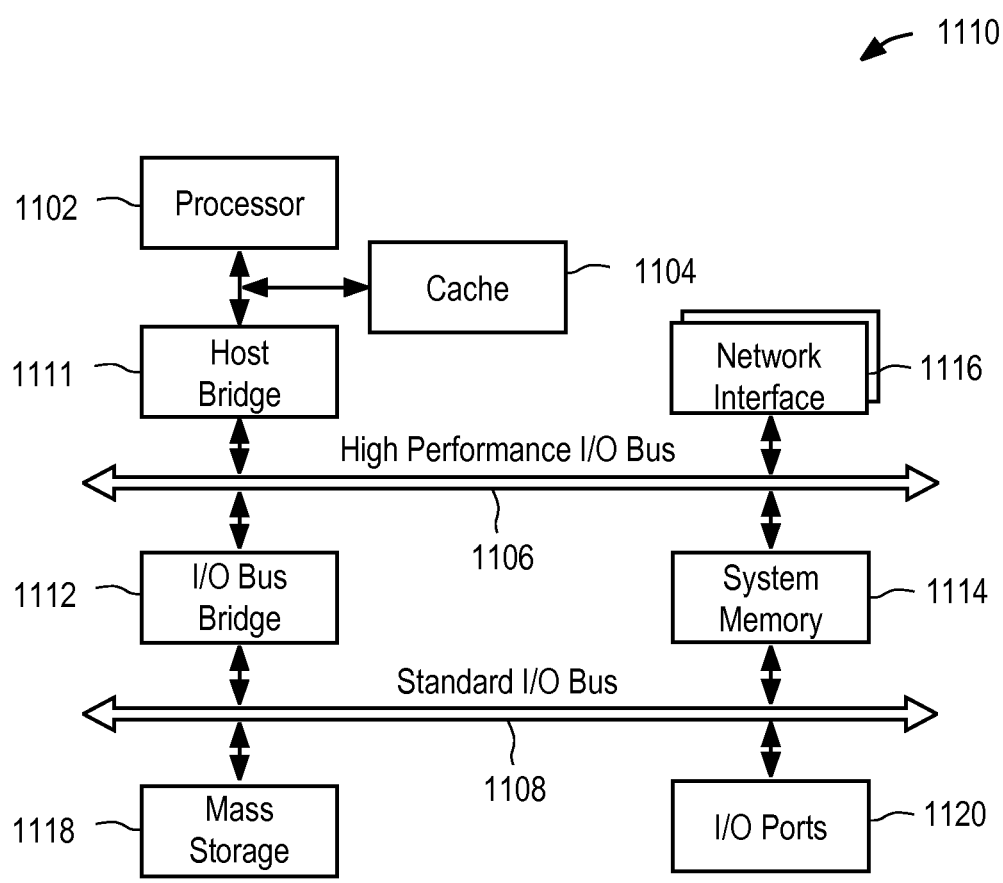
FIG. 11 is a block diagram illustrating an example computing system architecture that may be used to implement a server or a client system.

FIG. 11 is a block diagram illustrating an example computing system architecture that may be used to implement a server 1022 or a client system 1030. In one embodiment, hardware system 1110 comprises a processor 1102, a cache memory 1104, and one or more executable modules and drivers, stored on a tangible computer readable medium, directed to the functions described herein. Additionally, hardware system 1110 may include a high performance input/output (I/O) bus 1106 and a standard I/O bus 1108. A host bridge 1111 may couple processor 1102 to high performance I/O bus 1106, whereas I/O bus bridge 1112 couples the two buses 1106 and 1108 to each other. A system memory 1114 and one or more network/communication interfaces 1116 may couple to bus 1106. Hardware system 1110 may further include video memory (not shown) and a display device coupled to the video memory. Mass storage 1118 and I/O ports 1120 may couple to bus 1108. Hardware system 1110 may optionally include a keyboard, a pointing device, and a display device (not shown) coupled to bus 1108. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1110 are described in greater detail below. In particular, network interface 1116 provides communication between hardware system 1110 and any of a wide range of networks, such as an Ethernet (e.g., IEEE 802.3) network, a backplane, and so forth. Mass storage 1118 provides permanent storage for the data and programming instructions to perform the above-described functions implemented in servers 1022, whereas system memory 1114 (e.g., DRAM) provides temporary storage for the data and programming instructions when executed by processor 1102. I/O ports 1120 are one or more serial and/or parallel communication ports that provide communication between additional peripheral devices, which may be coupled to hardware system 1110.

Hardware system 1110 may include a variety of system architectures, and various components of hardware system 1110 may be rearranged. For example, cache 1104 may be on-chip with processor 1102. Alternatively, cache 1104 and processor 1102 may be packed together as a "processor module," with processor 1102 being referred to as the "processor core." Furthermore, certain embodiments of the present disclosure may not require nor include all of the above components. For example, the peripheral devices shown coupled to standard I/O bus 1108 may couple to high performance I/O bus 1106. In addition, in some embodiments, only a single bus may exist, with the components of hardware system 1110 being coupled to the single bus. Furthermore, hardware system 1110 may include additional components, such as additional processors, storage devices, or memories.

An operating system manages and controls the operation of hardware system 1110, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit. Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding," "locating," "permitting," and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, PDA, personal gaming device, etc.), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A system comprising:
a queuing layer configured to:
   receive a request to send a communication from an application executing on a client to an application executing on a server, the communication having a first priority for inclusion in a bucket of communications; and
   receive a request to send an additional communication from the application executing on the client to the application executing on the server, the additional communication having a second priority for inclusion in the bucket of communications; and
a processor-implemented communication layer configured to:
   place the communication into the bucket of communications based on the communication having the first priority;
   make a determination to send the bucket of communications to the application executing on the server, the making of the determination to send the bucket of communications based on an identification that a communication session for sending the bucket of communications does not currently exist and the sending of the bucket of communications to the application executing on the server includes establishing the communication session;
   place, using a processor, the additional communication into the bucket of communications based on a determination that the bucket of communications is not full; and
   send the bucket of communications to the application executing on the server.

2. The system of claim 1, wherein the communication layer is further configured to receive responses corresponding to a previous bucket of communications that the application executing on the client sent to the application executing on the server and wherein the making of the determination to send the bucket of communications is based on the receiving of the responses corresponding to the previous bucket of communications.

3. The system of claim 1, wherein the placing of the additional communication into the bucket of communications is based on an identification that a communication session for sending the bucket of communications currently exists.

4. The system of claim 1, wherein the bucket of communications has a number of slots and the placing of the communication into the bucket of communications includes placing the communication into a slot of the number of slots.

5. The system of claim 4, wherein the number of slots is configurable.

6. The system of claim 1, wherein the sending of the bucket of communications to the application executing on the server includes using one communication channel of multiple communication channels available to the application executing on the client, the multiple communication channels configured to be used in parallel, and the communication layer is further configured to send an additional bucket of communications to the application executing on the server using the one communication channel of the multiple communication channels.

7. A method comprising:

receiving a request to send a communication from an application executing on a client to an application executing on a server, the communication having a first priority for inclusion in a bucket of communications;

receiving a request to send an additional communication from the application executing on the client to the application executing on the server, the additional communication having a second priority for inclusion in the bucket of communications;

placing the communication into the bucket of communications based on the communication having the first priority;

making a determination to send the bucket of communications to the application executing on the server, the making of the determination to send the bucket of communications based on an identification that a communication session for sending the bucket of communications does not currently exist and the sending of the bucket of communications to the application executing on the server includes establishing the communication session;

placing, using a processor, the additional communication into the bucket of communications based on a determination that the bucket of communications is not full; and sending the bucket of communications to the application executing on the server.

8. The method of claim 7, further comprising receiving responses corresponding to a previous bucket of communications that the application executing on the client sent to the application executing on the server and wherein the making of the determination to send the bucket of communications is based on the receiving of the responses corresponding to the previous bucket of communications.

9. The method of claim 7, wherein the placing of the additional communication into the bucket of communications is based on an identification that a communication session for sending the bucket of communications currently exists.

10. The method of claim 7, wherein the bucket of communications has a number of slots and the placing of the communication into the bucket of communications includes placing the communication into a slot of the number of slots.

11. The method of claim 10, wherein the number of slots is configurable.

12. The method of claim 7, wherein the sending of the bucket of communications to the application executing on the server includes using one communication channel of multiple communication channels available to the application executing on the client, the multiple communication channels configured to be used in parallel, and the method further comprises sending an additional bucket of communications to the application executing on the server using the one communication channel of the multiple communication channels.

13. A non-transitory machine readable storage medium storing a set of instructions that, when executed by at least one processor, causes the at least one processor to perform operations comprising:

receiving a request to send a communication from an application executing on a client to an application executing on a server, the communication having a first priority for inclusion in a bucket of communications;

receiving a request to send an additional communication from the application executing on the client to the application executing on the server, the additional communication having a second priority for inclusion in the bucket of communications;

placing the communication into the bucket of communications based on the communication having the first priority;

making a determination to send the bucket of communications to the application executing on the server, the making of the determination to send the bucket of communications based on an identification that a communication session for sending the bucket of communications does not currently exist and the sending of the bucket of communications to the application executing on the server includes establishing the communication session;

placing, using a processor, the additional communication into the bucket of communications based on a determination that the bucket of communications is not full; and sending the bucket of communications to the application executing on the server.

14. The non-transitory machine readable storage medium of claim 13, further comprising receiving responses corresponding to a previous bucket of communications that the application executing on the client sent to the application executing on the server and wherein the making of the determination to send the bucket of communications is based on the receiving of the responses corresponding to the previous bucket of communications.

15. The non-transitory machine readable storage medium of claim 13, wherein the placing of the additional communication into the bucket of communications is based on an identification that a communication session for sending the bucket of communications currently exists.

16. The non-transitory machine readable storage medium of claim 13, wherein the bucket of communications has a number of slots and the placing of the communication into the bucket of communications includes placing the communication into a slot of the number of slots.

17. The non-transitory machine readable storage medium of claim 13, wherein the sending of the bucket of communications to the application executing on the server includes using one communication channel of multiple communication channels available to the application executing on the client, the multiple communication channels configured to be used in parallel, and the method further comprises sending an additional bucket of communications to the application executing on the server using the one communication channel of the multiple communication channels.

* * * * *